Oct. 10, 1950     F. D. WILLIAMS, JR     2,525,436

DRY CELL

Filed March 27, 1945

INVENTOR
Fred D. Williams, Jr.
BY
Chester F. Carlson
ATTORNEY

Patented Oct. 10, 1950

2,525,436

UNITED STATES PATENT OFFICE 2,525,436

DRY CELL

Fred D. Williams, Jr., New Rochelle, N. Y., assignor to Samuel Ruben, New Rochelle, N. Y.

Application March 27, 1945, Serial No. 585,143

10 Claims. (Cl. 136—108)

This invention relates to pressure release vents for electrolytic devices.

An object of the invention is to improve pressure release vents for electrolytic devices such as electric current producing cells, dry batteries and cells, electrolytic condensers and the like.

Another object is to improve the protective means against liquid leakage in vented cells and devices.

Other objects of the invention will be apparent from the description and claims.

One feature of the invention resides in an emergency vent arrangement for electrolytic cells and devices comprising a grooved wall member enclosing the cell elements. The member is adapted to split or spread to afford a fluid release should pressure develop. In its preferred form the weakening comprises crossed grooves or cuts in a metal wall which do not penetrate through the wall. Another feature resides in the combination of an emergency vent with an external receptacle for receiving any liquid which may issue from the vent. An absorbent or neutralizing material may be included in the receptacle.

Certain electrolytic devices, such as primary cells and electrolytic condensers, are substantially free from gas generation during normal use but sometimes are subject to gassing under unusual conditions, such as improper use, undue heating or the presence of excessive impurities. One type of primary cell develops very little or no gas during use but in some cases will produce a quantity of gas after the end of its useful electrical life.

It is desirable that such cells and condensers be completely enclosed and sealed to prevent leakage or evaporation of electrolyte and reaction of the cell elements and electrolyte with air. The vent arrangements described herein provide a complete seal under normal conditions but permit convenient release of pressure if it should develop during use or at the end of the cell life.

The present application is related to a copending application of Fred D. Williams, Jr., Serial No. 679,117, filed June 25, 1946, now Patent No. 2,478,798, dated August 9, 1949, for Primary Cell. In the said co-pending application, there is disclosed and claimed an electric current producing cell comprising a sealed container having cell elements and an electrolyte therein, a metal wall of said cell having a slit extending therethrough and normally closed by the metal-to-metal contact of the surfaces defining said slit, said slit being capable of opening responsive to excessive internal pressure.

Figure 1:
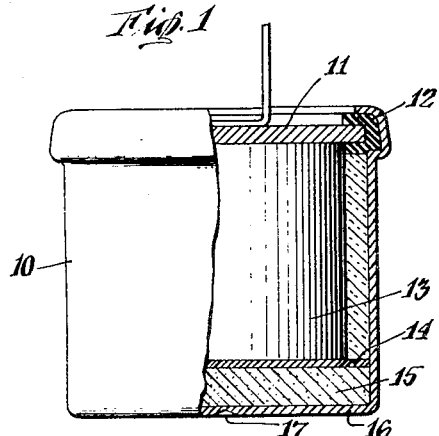
Figure 1 is a side view, partly in section of a primary cell embodying features of the invention.
Figure 2:
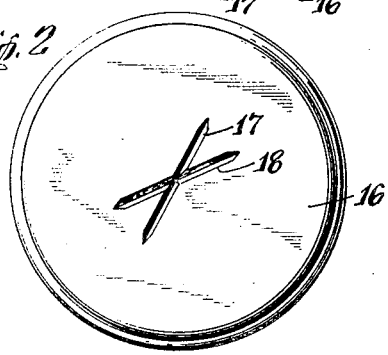
Figure 2 is a bottom view thereof.

Referring to the drawings, Figures 1 and 2 illustrate a primary cell comprising a steel can or container 10. The cell is sealed with a top disc 11 and sealing ring or grommet 12 of insulating material. The cell contains the usual cell elements which may, for example, comprise an electrode 13 secured to top disc 11, spacing material 14 containing an electrolyte, and an electrode 15 pressed into the bottom of the container.

According to the invention the plane bottom wall 16 of the container 10 has cut or impressed therein a pair of crossed chisel grooves 17 and 18. Preferably these extend for about one-third the diameter of the can and penetrate to a depth of about 75 to 85% of the wall thickness. The grooves cross each other at an angle which is desirably about 60°.

The grooves can be cut with a chisel or sharp edged tool by placing the empty container over a metal pedestal, placing the tool in the desired position and striking it with a hammer. They can also be made on a metal stamping press provided with a suitable tool.

Since grooves 17 and 18 do not penetrate through the bottom 16 the cell remains sealed under normal conditions. However, should gas pressure develop within the cell sufficient to bulge out bottom wall 16 slightly, the tension produced by the bulging will start a split or tear in the metal of wall 16 at the crossed grooves. This will open up a minute split or crossed splits. Ordinarily this will be sufficient to allow escape of the gas and the bulging will disappear so that the splits close tightly together. Additional gas generated can still escape but the cell is still substantially closed.

In one type of primary cells the generation of gas ordinarily takes place only at the end of the cell life at which time pressed electrode 15 will have been consumed or decomposed so that ready access of the gas to the vent is possible. In instances where gas pressure builds up before electrode 15 has been consumed the bulging of the bottom wall opens up a sufficient escape passage under or through electrode 15 to permit gas escape.

Figure 3:
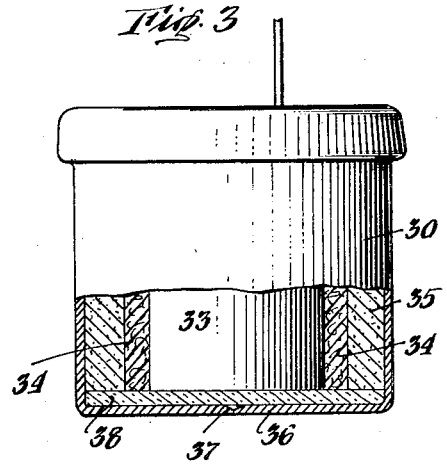
Figure 3 is a side view, partly in section of a modified cell construction.

Figure 3 shows the invention applied to a different cell construction. The cell container 30 has its bottom 36 grooved internally at 37 with a pair of crossed grooves. The cell electrodes 33 and 35 and spacer 34 rest on a disc 38 of sheet insulation which covers the groove. The operation when gas pressure develops is similar.

Figure 4:
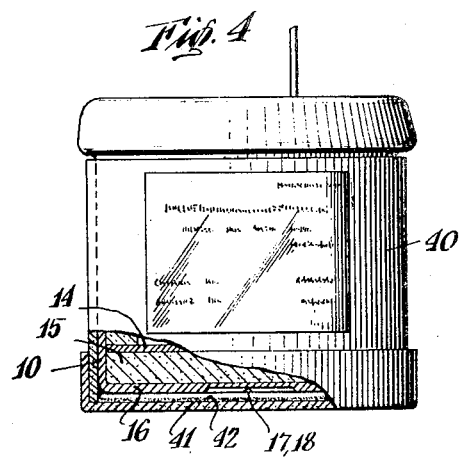
Figure 4 is a partly sectional view of a cell having a pressure release vent together with an enclosing casing containing a liquid absorbent or neutralizer.

Figure 4 shows the cell of Figure 1 enclosed in an outer tube 40, provided with a bottom 41 spaced slightly from bottom 16 of the cell. The tube and bottom may be of waxed cardboard, paper or of metal or partly cardboard and partly metal. The space between bottoms is filled or partly filled with an absorbent or reactive composition 42 to take up or neutralize any electrolyte which may leak out when the cell becomes vented. In the case of an alkaline electrolyte, for example, the material 42 may be an acid compound such as boric acid, phthalic acid or rosin, or a mixture with an absorbent such as wood flour or diatomaceous earth.

Figure 5:
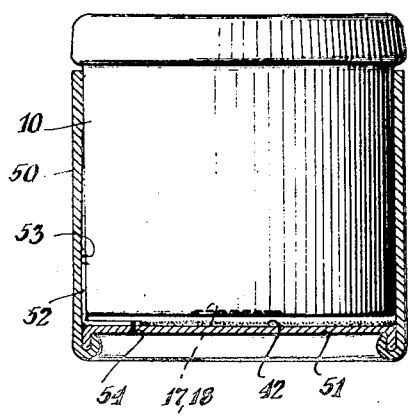
Figures 5 and 6 show further variations of cells having liquid absorbent in outer casings.

Figure 5 illustrates an outer tube construction adapted to provide a bottom terminal for the cell 10. This comprises a cardboard cylinder 50 rolled over the rim of a sheet metal bottom 51 of steel, tinned steel, copper or other metal. A metal tab strip 52 is welded or soldered at 53 to the wall of cell 10 and at 54 to the inside of metal bottom disc 51. The space between disc 51 and the bottom of cell 10 contains composition 42.

Figure 6:
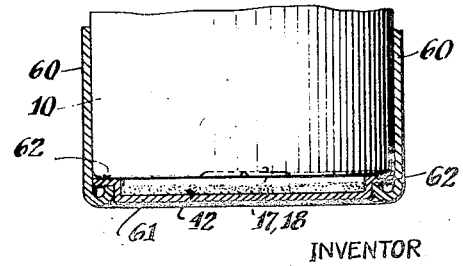

Figure 6 shows a further modification in which the material 42 is contained in a shallow metal cup 61 which is welded or soldered at two or three points 62 to the bottom of cell 10. A cardboard tube 60 encloses the side wall of the cell, if desired. There is sufficient leakage between the rim of cup 61 and bottom of cell 10 at the unwelded points to allow escape of gas, on venting.

It will be seen that the present invention provides for an emergency cell vent which becomes effective only if excessive gas pressure should develop within the cell. It is economical, of material, labor and space.

It is obvious that certain variations can be made in the location and shape of the vent grooves and in other features of construction without departing from the invention.

While specific embodiments of the invention have been described, it is intended to cover the invention broadly within the spirit and scope of the appended claims.

What is claimed is:

1. An electric current producing cell comprising a closed container and cell elements and electrolyte therein, a substantially plane metal end wall on said container being provided with crossed V-shaped grooves in a central area thereof, said grooves extending for about ⅓ the diameter of said end wall and penetrating from 75% to 90% of said wall thickness.

2. An enclosed dry cell comprising in combination electrode elements, an electrolyte therefor, a rigid metal wall in electrical connection with one of said electrode elements and constituting part of the cell enclosure, and an elongated narrow groove formed in said wall providing an integral linear wall portion of reduced thickness, said wall portion of reduced thickness constituting a positively determined tear line along which said wall will split in response to excessive internal gas pressure.

3. The cell as described in claim 2 characterized in that the housing comprises steel.

4. The cell as described in claim 2 characterized in that the groove is formed in a plane wall section of the housing.

5. The cell as described in claim 2 characterized in that the housing is surrounded by an external receptacle.

6. The cell as described in claim 2 characterized in that the housing is surrounded by an external receptacle containing an absorbent medium.

7. The cell as described in claim 2 characterized in that the housing is surrounded by a metal receptacle containing a neutralizer for the electrolyte of said cell.

8. An enclosed dry cell comprising in combination electrode elements, an electrolyte therefor, a rigid metal housing containing at least one of said electrode elements and constituting part of the cell enclosure, and an elongated narrow groove formed in a wall of said housing and providing an integral linear wall portion of reduced thickness, said wall portion of reduced thickness constituting a positively determined tear line along which said housing will split in response to excessive internal gas pressure.

9. An enclosed dry cell comprising in combination positive and negative electrodes, an electrolyte for said electrodes, a rigid metal housing containing at least one of said electrodes constituting part of the cell enclosure and one of the terminals of the cell, and an elongated narrow groove formed in a wall of said housing and providing an integral linear wall portion of reduced thickness, said wall portion of reduced thickness constituting a positively determined tear line along which said housing will split in response to excessive internal gas pressure.

10. In combination with an enclosed dry cell comprising a pair of metal housing members, an insulative member confined between cooperating portions of said housing members and constituting therewith an enclosure for the cell, a pair of electrode elements within said enclosure and in respective electrical contact with said housing members, an electrolyte for said electrode elements, and emergency venting means for said cell responsive to excessive internal gas pressure developed within said enclosure; an outer container partially enclosing said cell and defining therewith a space into which said venting means open, at least a portion of said outer container being formed of metal; and an electrical connection between one of said housing members and the metal portion of said outer container whereby said metal portion will constitute one of the external terminals of the cell.

FRED D. WILLIAMS, Jr.

REFERENCES CITED

The following references are of record in the file of this patent:

UNITED STATES PATENTS

| Number | Name | Date |
|---|---|---|
| 1,086,710 | Hoopes | Feb. 10, 1914 |
| 1,366,298 | Teitelbaum | Jan. 18, 1921 |
| 1,387,350 | Chamberlain | Aug. 9, 1921 |
| 1,737,718 | Hausmann | Dec. 3, 1929 |
| 1,920,799 | Lilienfeld | Aug. 1, 1933 |
| 2,111,041 | Brennan | Mar. 15, 1938 |
| 2,352,759 | Baum | July 4, 1944 |
| 2,482,514 | Ruben | Sept. 20, 1949 |